US010029539B2

United States Patent
Fuke et al.

(10) Patent No.: US 10,029,539 B2
(45) Date of Patent: Jul. 24, 2018

(54) AIR CONDITIONING DEVICE FOR VEHICLE AND AIR CONDITIONING CONTROL METHOD FOR VEHICLE

(71) Applicant: NISSAN MOTOR CO., LTD., Yokohama-shi, Kanagawa (JP)

(72) Inventors: Tetsuya Fuke, Ebina (JP); Tadashi Iwamoto, Kawasaki (JP); Takashi Watanabe, Machida (JP); Yugo Motegi, Yokohama (JP); Tetsuya Furumaya, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 287 days.

(21) Appl. No.: 14/409,807

(22) PCT Filed: Apr. 30, 2013

(86) PCT No.: PCT/JP2013/062615
§ 371 (c)(1),
(2) Date: Dec. 19, 2014

(87) PCT Pub. No.: WO2014/002610
PCT Pub. Date: Jan. 3, 2014

(65) Prior Publication Data
US 2015/0367711 A1 Dec. 24, 2015

(30) Foreign Application Priority Data

Jun. 26, 2012 (JP) ................. 2012-142720

(51) Int. Cl.
*B60H 1/32* (2006.01)
*B60H 1/00* (2006.01)
*F02D 41/12* (2006.01)

(52) U.S. Cl.
CPC ....... *B60H 1/3208* (2013.01); *B60H 1/00764* (2013.01); *F02D 41/123* (2013.01);
(Continued)

(58) Field of Classification Search
CPC .. B60H 1/3208; B60H 1/00764; F02D 41/123
See application file for complete search history.

(56) References Cited

U.S. PATENT DOCUMENTS 7,100,383 B2* 9/2006 Sugesawa ............ B60H 1/3208
62/133
7,308,799 B1* 12/2007 Harrison .............. B60H 1/3208
62/133

(Continued)

FOREIGN PATENT DOCUMENTS

JP 2003-165331 A 6/2003
JP 2008-120295 A 5/2008
(Continued)

*Primary Examiner* — Nelson Nieves
(74) *Attorney, Agent, or Firm* — Foley & Lardner LLP

(57) ABSTRACT

An air conditioning device for vehicle includes a refrigeration cycle including a compressor for sucking, compressing and discharging a refrigerant, a condenser for condensing the high-temperature and high-pressure refrigerant discharged from the compressor, an expansion valve for decompressing the refrigerant condensed in the condenser and an evaporator for evaporating the refrigerant through heat exchange between the refrigerant reduced in pressure by the expansion valve and surrounding air. This air conditioning device for vehicle increases an operation rate of the compressor more than that before a vehicle speed drops below a first permitted vehicle speed higher than a fuel cut recovery vehicle speed when an air conditioner is on, at which the compressor is actuated, when the vehicle speed drops below the first permitted vehicle speed during the deceleration of a vehicle associated with a fuel cut.

8 Claims, 12 Drawing Sheets

(52) U.S. Cl.
CPC .............. *B60H 2001/3266* (2013.01); *B60H 2001/3272* (2013.01)

(56) References Cited

U.S. PATENT DOCUMENTS

| | | | | |
|---|---|---|---|---|
| 7,454,917 | B2* | 11/2008 | Nadamoto | B60H 1/3208 62/133 |
| 2002/0112489 | A1* | 8/2002 | Egawa | B60H 1/3208 62/133 |
| 2002/0157412 | A1* | 10/2002 | Iwanami | B60H 1/3208 62/236 |
| 2002/0157414 | A1* | 10/2002 | Iwanami | B60H 1/3208 62/239 |
| 2004/0031277 | A1* | 2/2004 | Hirose | B60H 1/3208 62/186 |
| 2004/0250560 | A1* | 12/2004 | Ikura | B60H 1/3205 62/236 |
| 2005/0066669 | A1* | 3/2005 | Sugesawa | B60H 1/3208 62/133 |
| 2008/0034767 | A1* | 2/2008 | Ziehr | B60H 1/00764 62/180 |
| 2008/0093132 | A1* | 4/2008 | Wijaya | B60H 1/3208 180/53.8 |
| 2008/0229767 | A1* | 9/2008 | Nakamura | B60H 1/3208 62/133 |
| 2009/0198438 | A1* | 8/2009 | Jinno | B60H 1/3208 701/110 |
| 2012/0000210 | A1* | 1/2012 | Kim | B60H 1/3208 62/61 |
| 2012/0184405 | A1* | 7/2012 | Morimura | F02D 41/123 477/54 |
| 2012/0318015 | A1 | 12/2012 | Motegi et al. | |
| 2013/0074529 | A1* | 3/2013 | Rollinger | B60H 1/3208 62/115 |

FOREIGN PATENT DOCUMENTS

| | | |
|---|---|---|
| JP | 2009-29344 A | 2/2009 |
| JP | 2009-154627 A | 7/2009 |
| JP | 4399989 B2 | 2/2010 |
| JP | 2013-1172 A | 1/2013 |
| WO | WO 2011124800 A1 * | 10/2011 ........... B60H 1/3208 |

* cited by examiner

AIR CONDITIONING DEVICE FOR VEHICLE AND AIR CONDITIONING CONTROL METHOD FOR VEHICLE

TECHNICAL FIELD

The prevent invention relates to an air conditioning device for vehicle and an air conditioning control method for vehicle.

BACKGROUND ART

A technique is known in which an operation rate of a compressor is increased more than that during the non-execution of a deceleration lock-up immediately after the execution of the deceleration lock-up is started, an increase of the operation rate of the compressor is finished upon the elapse of a predetermined time Tup after the start of the execution of the deceleration lock-up and the operation rate of the compressor is reduced more than that during the non-execution of the deceleration lock-up immediately after this end of the increase (JP 4399989B).

SUMMARY OF INVENTION

In the technique of JP 4399989B, evaporator cooling power may become insufficient or excessive between a lock-up release vehicle speed when an air conditioner is on and that when the air conditioner is off due to the setting of the predetermined time Tup.

The technique of JP 4399989B focuses on the lock-up release vehicle speed. This concept can be possibly extended to a fuel cut recovery timing. In the case of the concept extended to the fuel cut recovery timing, the evaporator cooling power may become insufficient or excessive between a fuel cut recovery timing when the air conditioner is on and that when the air conditioner is off due to the setting of the predetermined time Tup.

The present invention aims to provide a technique capable of appropriately maintaining evaporator cooling power also between a fuel cut recovery timing when an air conditioner is on and that when the air conditioner is off.

An air conditioning device for vehicle according to one aspect includes a refrigeration cycle including a compressor for sucking, compressing and discharging a refrigerant, a condenser for condensing the high-temperature and high-pressure refrigerant discharged from the compressor, an expansion valve for decompressing the refrigerant condensed in the condenser and an evaporator for evaporating the refrigerant through heat exchange between the refrigerant reduced in pressure by the expansion valve and surrounding air, vehicle deceleration fuel cut execution means for executing a fuel cut during the deceleration of a vehicle, and control means for increasing an operation rate of the compressor more than that before a vehicle speed drops below a first permitted vehicle speed higher than a fuel cut recovery vehicle speed when an air conditioner is on, at which the compressor is actuated, when the vehicle speed drops below the first permitted vehicle speed during the deceleration of the vehicle.

Embodiments and advantages of the present invention are described in detail below with reference to the accompanying drawings.

DESCRIPTION OF EMBODIMENTS

Hereinafter, embodiments of the present invention are described with reference to the drawings.

First Embodiment

Figure 1:
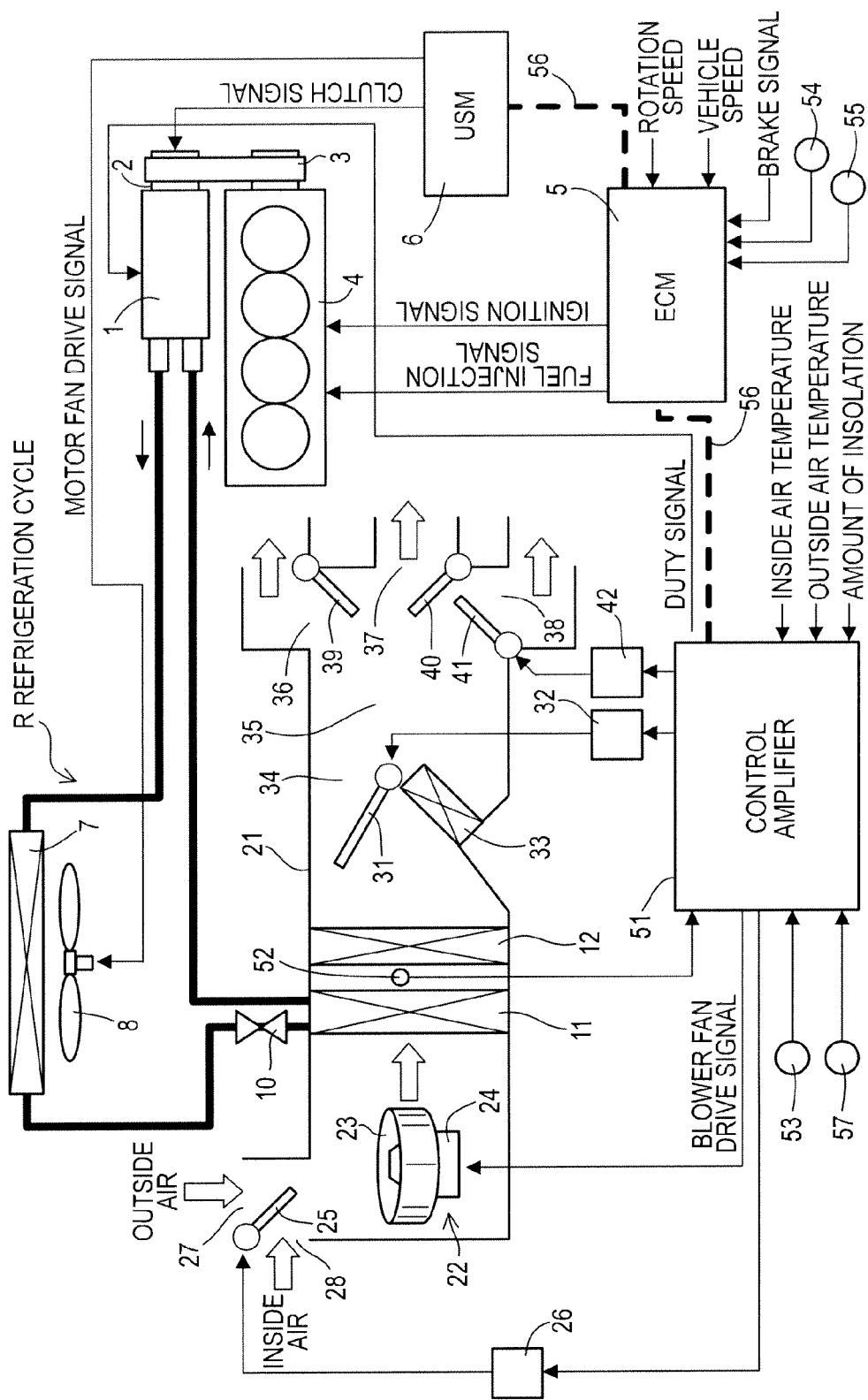
FIG. 1 is a schematic configuration diagram of an air conditioning device for vehicle of a first embodiment.

FIG. 1 is a schematic configuration diagram of an air conditioning device for vehicle of a first embodiment. In FIG. 1, a refrigeration cycle R of the air conditioning device for vehicle includes a compressor 1, a condenser 7, an expansion valve 10 and an evaporator 11. The compressor 1 for sucking, compressing and discharging a refrigerant includes an electromagnetic clutch 2 for intermittent power transmission. Since power of an engine 4 is transmitted to the compressor 1 via the electromagnetic clutch 2 and a belt 3, the compressor 1 is intermittently operated by controlling energization and de-energization to the electromagnetic clutch 2 by an engine control module (ECM) 5 and an under switching module (USM) 6.

The high-temperature and high-pressure gaseous refrigerant discharged from the compressor 1 flows into the condenser 7 and is cooled and condensed through heat exchange with outside air blown by a cooling fan 8. The refrigerant condensed in the condenser 7 is decompressed to a low pressure by the expansion valve 10 to enter a gas-liquid two-phase state of low pressure. The low-pressure refrigerant from the expansion valve 10 flows into the evaporator 11. The evaporator 11 is disposed in an air conditioner case 21 of the air conditioning device for vehicle and the low-pressure refrigerant having flowed into the evaporator 11 absorbs heat from air in the air conditioner case 21 to be evaporated. An exit of the evaporator 11 is coupled to a suction side of the compressor 1. In this way, the refrigeration cycle R constitutes a closed circuit.

In the air conditioner case 21, an air blower 22 is arranged upstream of the evaporator 11. The air blower 22 includes a blower fan 23 and a drive motor 24. At a suction side of the blower fan 23, an outside air inlet port 27 and an inside air inlet port 28 are opened and closed by an inside/outside air switching door 25. In this way, outside air (vehicle outside air) or inside air (vehicle inside is switchingly introduced. The inside/outside air switching door 25 is driven by an electric driving device 26 composed of a servo motor.

On the other hand, a cold storage device 12 and an air mixing door 31 to be described later are successively arranged downstream of the evaporator 11. A hot water heater core (heating heat exchanger) 33 for heating air using hot water (cooling water) of the engine 4 as a heat source is disposed downstream of the air mixing door 31. A bypass passage 34 in which air (cold air) flows while bypassing the hot water heater core 33 is formed lateral to (above) this hot water heater core 33.

The air mixing door 31 is a rotatable plate-like door and driven by an electric driving device 32 composed of a servo motor. The air mixing door 31 adjusts an air volume ratio of hot air passing through the hot water heater core 33 and cooling air passing in the bypass passage 34. By adjusting the air volume ratio of cooling air and hot air, the temperature of air blown into the vehicle interior is adjusted.

An air mixing unit 35 is provided downstream of the hot water heater core 33. Here, the hot air from the hot water heater core 33 and the cold air from the bypass passage 34 are mixed to produce air of a desired temperature.

Further, a defroster opening 36, a face opening 37 and a foot opening 38 are formed downstream of the air mixing unit 35, and the respective openings are opened and closed by a defroster door 39, a face door 40 and a foot door 41 in the form of rotatable plates. Three doors 39, 40 and 41 are coupled to a common link mechanism and driven by an electric driving device 42 composed of a servo motor via this link mechanism. For example, when the defroster door 39 is open, air is blown to an inner surface of a vehicle windshield via an unillustrated defroster duct. When the face opening 37 is open, air is blown toward the upper body of a vehicle passenger via an unillustrated face duct. Further, when the foot opening 38 is opened, air is blown toward the feet of the vehicle passenger via an unillustrated foot duct.

An evaporator temperature (evaporator blowing temperature) from a temperature sensor 52, an air conditioning signal from an air conditioning switch 53 and a signal from a thermo switch 57 are input to a control amplifier 51 (compressor operation rate control means). The control amplifier 51 sends a signal for actuating the compressor 1 to the engine control module 5 by a CAN communication 56 when the air conditioning switch 53 is turned on.

The control amplifier 51 sends a duty signal to the engine control module 5 by the CAN communication so that the evaporator temperature lies within a control range based on a signal from the thermo switch 57 when the air conditioning switch 53 is on. It should be noted that the control amplifier 51 controls the blower fan drive motor 24 to attain a target air volume and drives the electric driving devices 26, 32 and 42 to automatically control a blowout port and a suction port.

The engine control module 5 controls a fuel injection amount into the engine 4, a fuel injection timing and an ignition timing based on signals from various sensors for detecting operating states of the engine 4.

A refrigerant pressure from a refrigerant pressure sensor 54 and an accelerator pedal opening from an accelerator sensor 55 are input to the engine control module 5. When determining based on these signals that the compressor 1 can be actuated, the engine control module 5 sends a compressor ON signal to the under switching module 6 by the CAN communication 56. The under switching module 6 having received the compressor ON signal from the engine control module 5 turns on an air conditioner relay in the module 6 and connects the electromagnetic clutch 2 to actuate the compressor 1.

Further, to improve fuel economy, the engine control module 5 (deceleration fuel cut execution means) executes a fuel cut during the deceleration of the vehicle. The engine control module 5 (fuel cut recovery execution means) releases the fuel cut at a faster fuel cut recovery speed when the deceleration fuel cut is in execution and the air condition is on than when the deceleration fuel out is in execution and the air condition is off, and performs a fuel cut recovery. Here, that the air conditioner is on means that the air conditioning switch 53 is on and that the air conditioner is off means that the air conditioning switch 53 is off.

The cold storage device 12 is provided immediately downstream of the evaporator 11. As shown in FIG. 1, the cold storage device 12 is an configured that the total volume of cold air after passage through the evaporator 11 (total air volume in the air conditioner case 21) passes therethrough by being shaped to have the same front surface area as the evaporator 11. In this way, the cold storage device 12 can have a thin structure with a small thickness in an air flowing direction in the air conditioner case 21.

The cold storage device 12 as a heat exchanger is configured, for example, by forming tube-like members of aluminum or like metal with excellent heat conductivity and storing and sealing a cold storage agent in these tube-like members. A multitude of tube-like members are arranged at predetermined intervals and air passes through clearances between the multitude of these tube-like members. The configuration of the cold storage device 12 is not limited to this and the cold storage device may be so configured that a cold storage agent to be cooled by the refrigerant flowing through the evaporator 11 is sealed inside.

A conventional device is known which executes a control to increase a compressor operation rate immediately after the start of the execution of a deceleration lock-up, finishes an increase of the operation rate of the compressor 1 upon the elapse of a predetermined time Tup after the start of the deceleration lock-up and reduces the operation rate of the compressor 1 immediately after this end of the increase. This extends a fuel cut time by enabling a lock-up release vehicle speed to be reduced from that when the air conditioner is on to that when the air conditioner is off.

In the conventional device, it is unavoidable that evaporator cooling power becomes insufficient or excessive between the lock-up recovery vehicle speed when the air conditioner is on and that when the air conditioner is off due to the setting of the predetermined time Tup.

The conventional device focuses on the lock-up release vehicle speed. This concept can be possibly extended to a fuel cut recovery vehicle speed. In the case of the concept extended to the fuel cut recovery vehicle speed, the evaporator cooling power may become insufficient or, conversely, become excessive between a fuel cut recovery vehicle speed Vacrec when the air conditioner is on and that Vrec when the air conditioner is off due to the setting of the predetermined time Tup.

Figure 2:
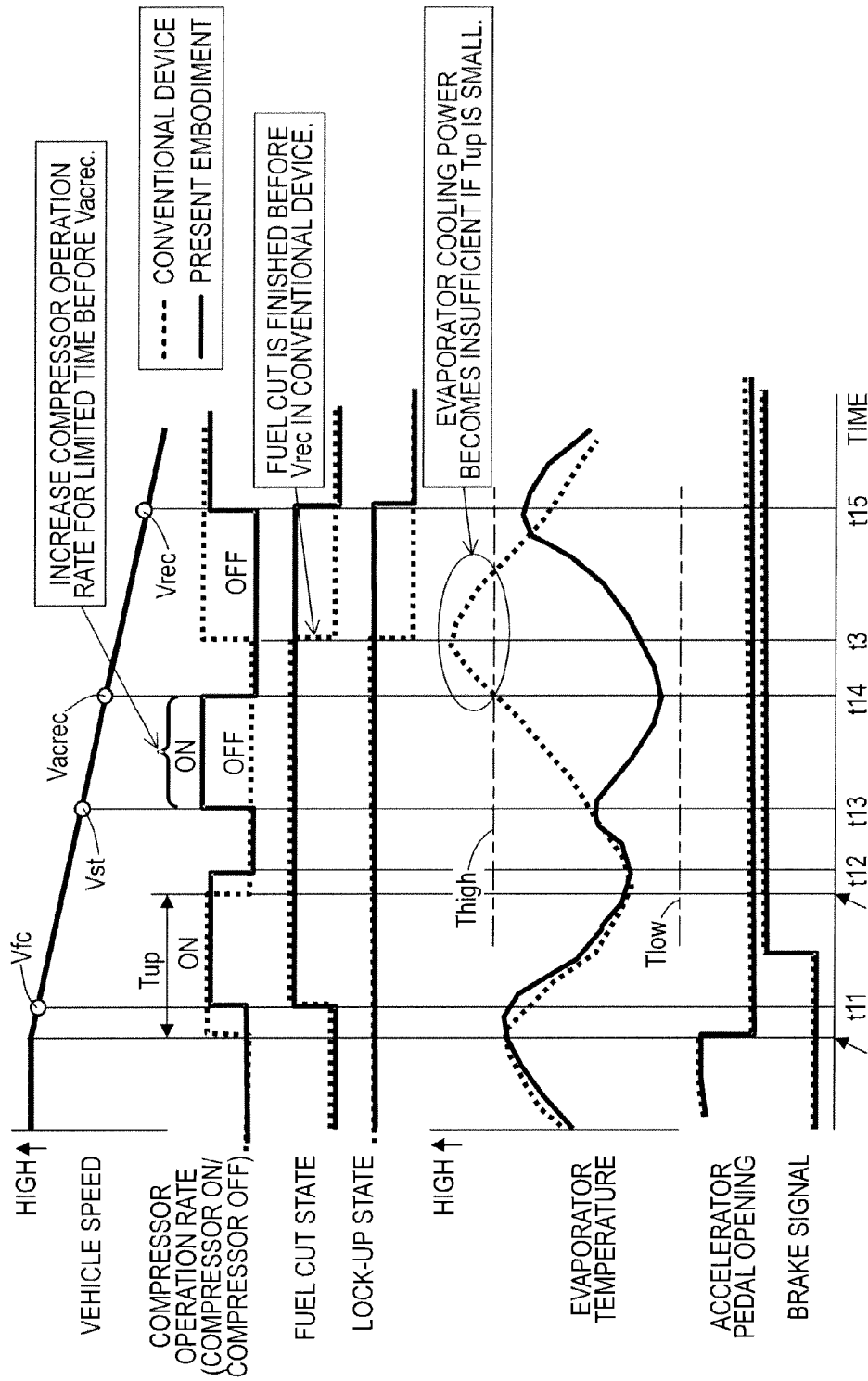
FIG. 2 is a timing chart showing changes of a vehicle speed, a compressor operation rate, an evaporator temperature and the like during a deceleration fuel cut.

Here, a case where the evaporator cooling power becomes insufficient is particularly described with reference to FIG. 2. A timing chart of FIG. 2 shows how the vehicle speed, the compressor operation rate, the evaporator temperature and the like change during the deceleration fuel cut by models. Changes in the case of the conventional device are shown by broken line and those in the case of the present embodiment are shown by solid line. It is assumed that the predetermined time Tup is set to be relatively short in the conventional device. It should be noted that a case of a compressor of a fixed displacement type (hereinafter, merely referred to as a fixed displacement type compressor) having two values, i.e. an ON state and an OFF state by simplifying the operation of the compressor 1 is shown in the second row of FIG. 2. In the case of a compressor of a variable displacement type (hereinafter, merely referred to as a variable displacement type compressor) capable of duty-controlling the compressor operation rate, "ON" and "OFF" for the fixed displacement type compressor have only to be replaced as follows. Specifically, "ON" has only to be replaced by a relative increase of the compressor operation rate and "OFF" has only to be replaced by a relative reduction of the compressor operation rate.

It should be noted that although the conventional device is limited to "during the deceleration lock-up", "during the deceleration fuel cut" is considered as a concept including "during the deceleration lock-up" in the present invention. At this time, "during the deceleration lock-up" of the conventional device can be replaced by "during the deceleration fuel cut" of the present embodiment.

In FIG. 2, when the deceleration of the vehicle is started at timing t1 from a high vehicle speed (e.g. 100 km/h), the vehicle speed linearly drops. In this case, in the conventional device, the compressor 1 is kept on for the predetermined time Tup from timing t1 at which the deceleration of the vehicle is started, and turned off after the elapse of the predetermined time Tup. The predetermined time Tup specifies a period during which the compressor 1 is on. If this predetermined time Tup is set to be a relative short period from t1 to t2, the compressor 1 is turned off at timing t2 at which the vehicle speed is not sufficiently decelerated with respect to the fuel cut recovery vehicle speed Vacrec when the air conditioner is on, at which the compressor 1 is actuated. Thus, the evaporator temperature rises (i.e. the cooling power of the evaporator 11 is reduced) and the effect of air conditioning in the vehicle interior associated with the OFF state of the compressor 1 is deteriorated when the vehicle speed is decelerated to the fuel cut recovery vehicle speed Vacrec when the air conditioner is on.

To deal with such deterioration of the effect of air conditioning in the vehicle interior, the fuel cut may be finished and the compressor 1 may be driven by the engine 4, for example, at timing t3. However, by this method, the fuel cut is finished before the fuel cut recovery vehicle speed Vrec when the air conditioner is off is reached, thereby causing a problem that fuel economy cannot be improved.

Accordingly, in the first embodiment of the present invention, the operation rate of the compressor 1 is increased more than that before the vehicle speed V drops below a first permitted vehicle speed Vst higher than the fuel cut recovery vehicle speed Vacrec when the air conditioner is on, at which the compressor 1 is actuated, when the vehicle speed V drops below the first permitted vehicle speed Vst during the deceleration fuel cut. In other words, the compressor 1 is forcibly turned on regardless of the signal from the thermo switch 57 during a predetermined period immediately before the fuel cut recovery vehicle speed Vacrec when the air conditioner is on is reached during the deceleration of the vehicle. When the vehicle speed drops and reaches the fuel cut recovery vehicle speed Vacrec when the air conditioner is on, the compressor 1 is returned to the OFF state in a vehicle speed region up to the fuel cut recovery vehicle speed Vrec when the air conditioner is off.

This is described again with reference to FIG. 2. As described above, a solid line represents the case of the present embodiment.

In FIG. 2, the compressor 1 is on/off controlled as during the non-execution of the fuel cut in a vehicle speed region from a deceleration fuel cut execution starting vehicle speed Vfc to the first permitted vehicle speed Vst. Specifically, the compressor 1 is switched from the OFF state to the ON state since the evaporator temperature drops below a lower limit temperature (Tevalo) and the thermo switch 57 is turned off at t11. This causes the evaporator temperature to drop from t11. The compressor is switched from the ON state to the OFF state since the evaporator temperature rises above an upper limit temperature (Tevahi) and the thermo switch 57 is turned on at t12. This causes the evaporator temperature to rise from t12.

However, the vehicle speed V reaches the first permitted vehicle speed Vst at timing t13 immediately after t12. Since the compressor 1 is forcibly turned on (the compressor operation rate is increased more than that before the vehicle speed V drops below the first permitted vehicle speed Vst) in a vehicle speed region from Vst to Vacrec, the evaporator temperature drops in an interval from t13 to t14. This can prevent a reduction in the cooling power of the evaporator 11 before timing t14 at which the vehicle speed V reaches the fuel cut recovery vehicle speed Vacrec when the air conditioner is on. Although the cooling power of the evaporator 11 is reduced if only the evaporator temperature is controlled based on the thermo switch 57, the deterioration of the effect of air conditioning in the vehicle interior associated with a reduction of the compressor operation rate can be prevented by forcibly turning on the compressor 1.

Figure 3:
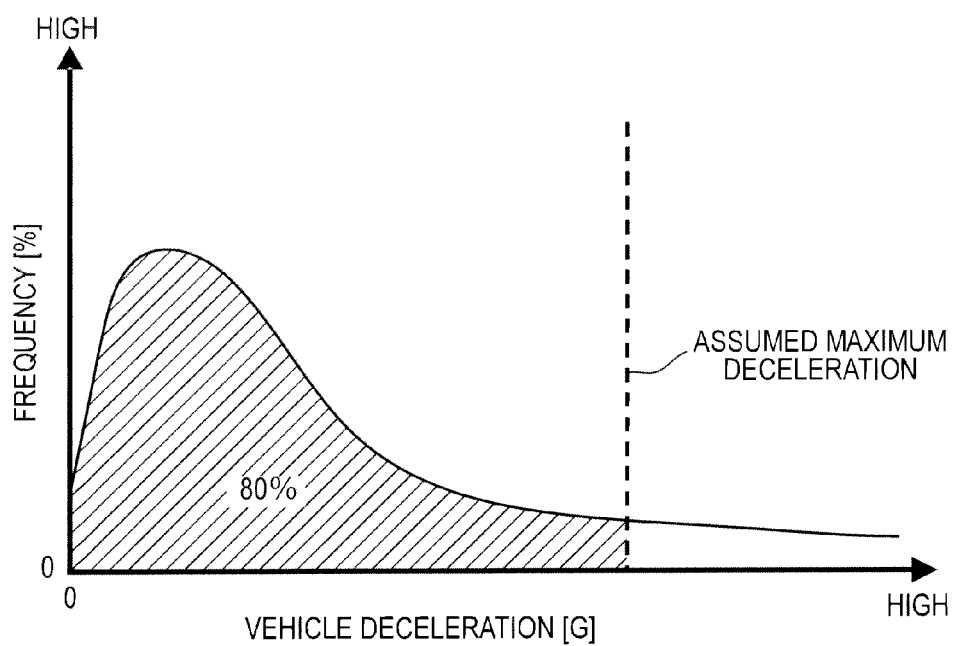
FIG. 3 is a characteristic graph of a frequency distribution in relation to vehicle deceleration.

Next, how to set the first permitted vehicle speed Vst is described. FIG. 3 shows a frequency distribution in relation to vehicle deceleration obtained by compiling data actually collected through a market research on how vehicles are decelerated. It should be noted that the vehicle deceleration is treated as an absolute value in the present embodiment. That is, it is assumed that the vehicle deceleration on a horizontal axis of FIG. 3 increases as the vehicle is more rapidly decelerated. Since it is not realistic to cover all vehicle decelerations in an actual market in the present invention, the vehicle deceleration at a position to cover decelerations up to 80% (predetermined rate) from a low side is set as an "assumed maximum deceleration" when the entire area of the frequency distribution is 100% in FIG. 3. Although the predetermined rate is set at 80% here, there no limitation to this rate.

Even when the vehicle is decelerated at the assumed maximum deceleration predetermined in this way, the first permitted vehicle speed Vst is determined by adding a requirement that the compressor 1 can be kept on for a predetermined time tac (e.g. about several seconds). Here, the requirement that the compressor 1 can be kept on for the predetermined time is added for the following reason. Specifically, a time during which necessary cooling power is obtained is set at the predetermined time since necessary cooling power of the evaporator 11 may not be obtained if the compressor 1 is merely kept on for a short time.

Figure 4:
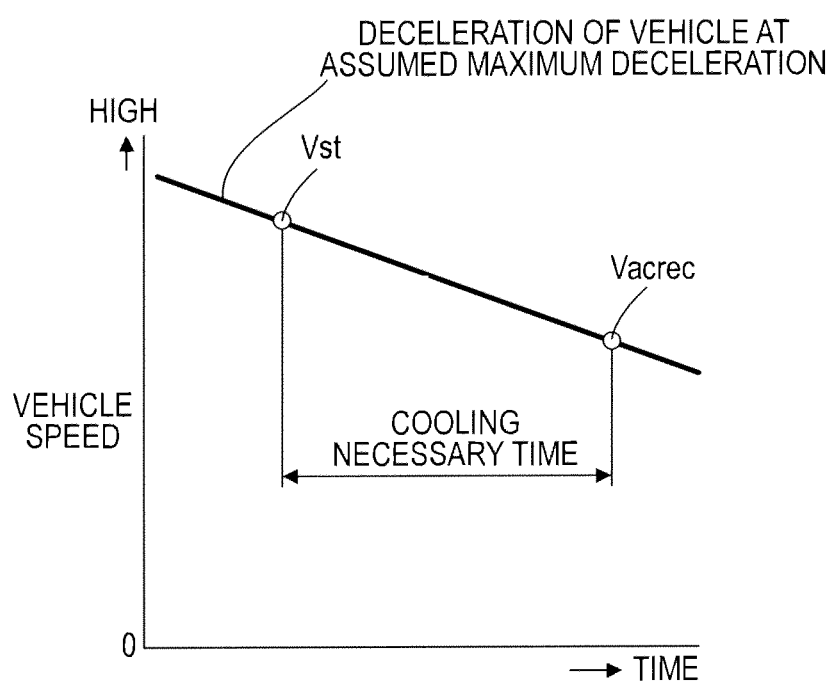
FIG. 4 is a characteristic graph showing a vehicle speed change when a fuel cut recovery vehicle speed when an air conditioner is on is reached at an assumed maximum deceleration.

FIG. 4 shows a vehicle speed change when the vehicle is decelerated at the predetermined assumed maximum deceleration and reaches the fuel cut recovery vehicle speed Vacrec when the air conditioner is on. From FIG. 4, the vehicle speed at a timing before the predetermined time tac from the fuel cut recovery vehicle speed Vacrec when the air conditioner is on is determined as the first permitted vehicle speed Vst. In other words, the first permitted vehicle speed Vst can be calculated by the following equation.

$$Vst = Vacrec + \text{assumed maximum deceleration} \times tac \quad (1)$$

where tac: predetermined time (cooling necessary time).

Figure 5:
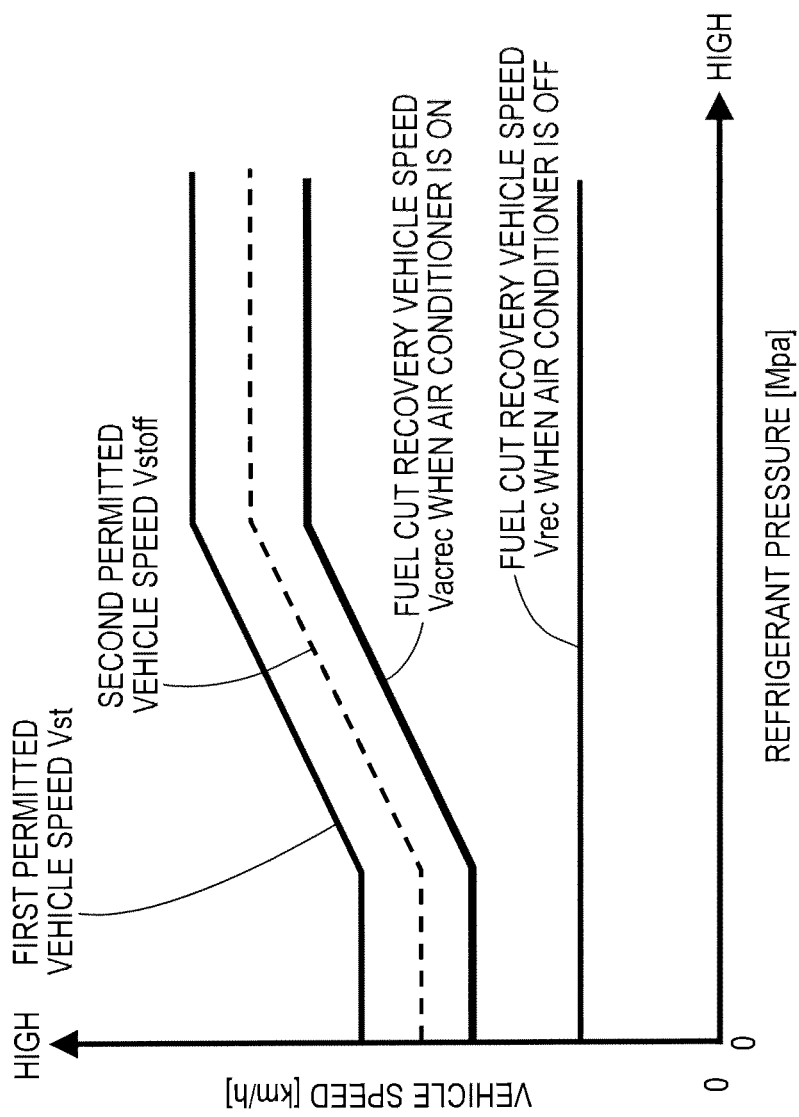
FIG. 5 is a characteristic graph of a first permitted vehicle speed, a second permitted vehicle speed and the fuel cut recovery vehicle speed when the air conditioner is on in relation to refrigerant pressure.

Here, the fuel cut recovery vehicle speed Vacrec when the air conditioner is on on the right side of the equation (1) is set according to the refrigerant pressure. This is shown in FIG. 5. Vacrec is higher in a region where the refrigerant pressure is relatively high than in a region where the refrigerant pressure is relatively low. This is for the following reason. Specifically, that the refrigerant pressure is relatively high means that the vehicle deceleration is relatively high. If the vehicle deceleration is relatively high, a torque shock at the time of a fuel cut recovery is increased by that much. Thus, the lock-up release vehicle speed (accordingly Vacrec) needs to be increased. It should be noted that Vacrec is constant at sides where the refrigerant pressure is high and low due to the ability of the air compressor 1.

Since Vacrec on the right side of the above equation (1) is dependent on the refrigerant pressure as just described, the first permitted vehicle speed Vst is set to be higher in the region where the refrigerant pressure is relatively high than in the region where the refrigerant pressure is relatively low according to the refrigerant pressure as shown in FIG. 5.

The cooling necessary time tac on the right side of the above equation (1) is determined by the ability of the compressor 1 on a condition that an outside air temperature is constant. For example, on the condition that the outside air temperature is constant, it is possible to make the cooling necessary time tac relatively short when the ability of the compressor 1 is relatively high and make the cooling necessary time tac relatively long when the ability of the compressor 1 is relatively low.

In the present embodiment, the outside air temperature is thought to be constant. It should be noted that the first permitted vehicle speed Vst may be corrected by the outside air temperature. For example, by setting the outside air temperature when a characteristic of FIG. 5 is applied as a reference outside air temperature, the first permitted vehicle speed Vst is corrected to be increased as the outside air temperature increases from this reference outside air temperature.

Figure 6:
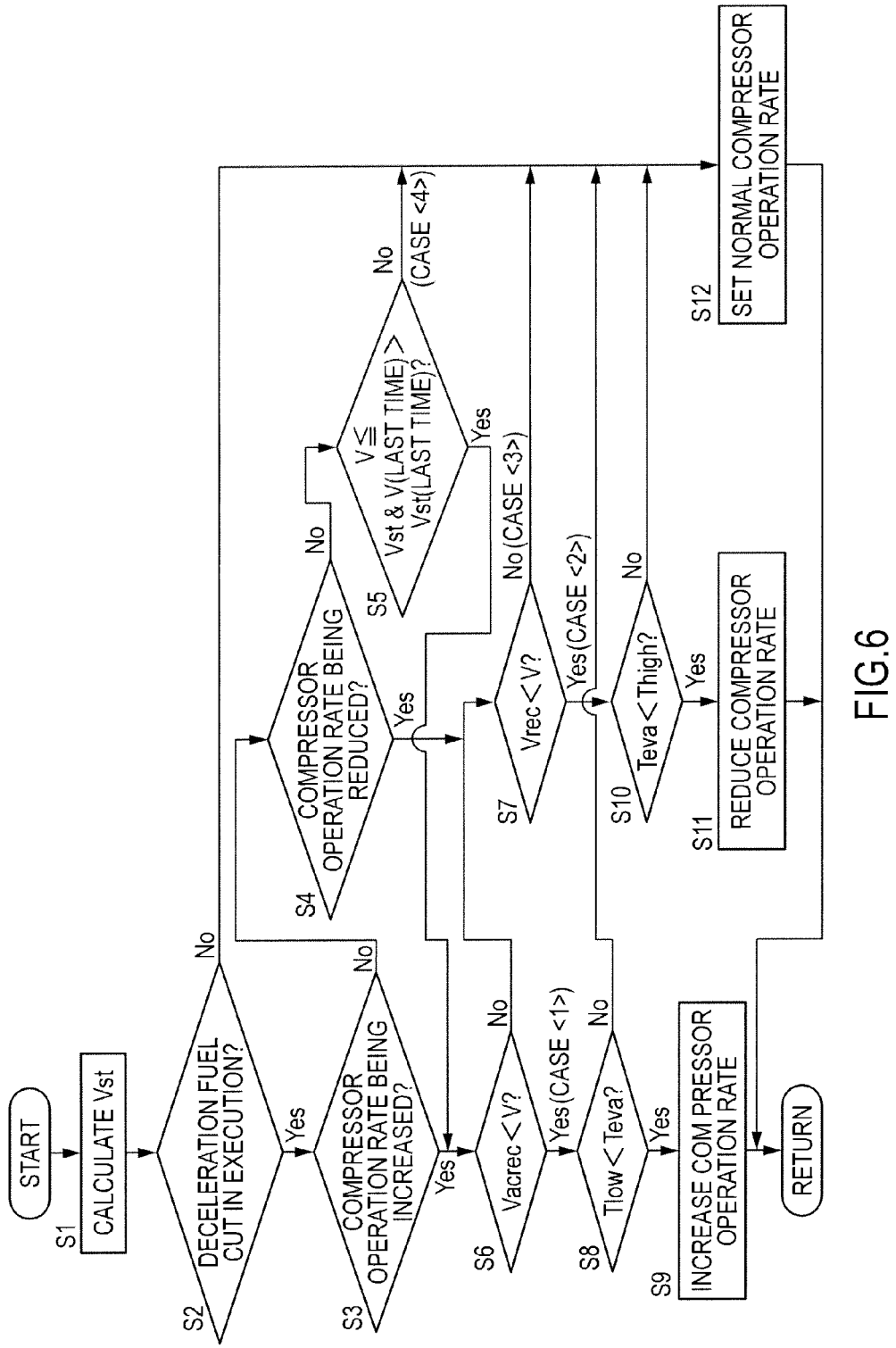
FIG. 6 is a flow chart showing a control of a compressor during the deceleration fuel cut.

The control of the compressor 1 during the deceleration fuel cut executed by the control amplifier 51 is described in detail with reference to a flow chart of FIG. 6. The flow chart of FIG. 6 is executed at regular time intervals (e.g. every 10 ms).

In Step S1, the first permitted vehicle speed Vst is calculated by searching a table having FIG. 5 as contents based on the refrigerant pressure detected by the refrigerant pressure sensor 54. As shown in FIG. 5, the first permitted vehicle speed Vst is a value which is higher in the region where the refrigerant pressure is relatively high than in the region where the refrigerant pressure is relatively low according to the refrigerant pressure. This is because Vst is also dependent on the refrigerant pressure since Vst is dependent on Vacrec by the above equation (1) and Vacrec is dependent on the refrigerant pressure.

In Step S2, whether or not the deceleration fuel cut is in execution is determined. For example, if the accelerator pedal opening is zero (accelerator pedal is returned) and the vehicle speed V at that time is above the fuel cut execution starting vehicle speed Vfc, a fuel cut permission condition is satisfied and a fuel cut flag=1. When the fuel cut flag=1, the engine control module 5 executes the fuel cut. Thus, when the fuel cut flag=0, it is determined that the deceleration fuel cut is not in execution and an advance is made to Step S12.

In Step S12, a normal compressor operation rate is set. That "the normal compressor operation rate is set" means that the compressor 1 is on/off controlled based on a signal from the thermo switch 57. The thermo switch 57 is for maintaining the evaporator temperature in the control range between the upper limit temperature Tevahi and the lower limit temperature Tevalo. The thermo switch 57 is turned off at a timing at which the evaporator temperature drops below the lower limit temperature Tevalo and turned on at a timing at which the evaporator temperature rises above the upper limit temperature Tevahi. In the control amplifier 51, the electromagnetic clutch 2 is connected to send a signal for actuating the compressor 1 to the engine control module 5 when the thermo switch 57 is on, whereby the evaporator temperature is returned to the control range. On the other hand, the electromagnetic clutch 2 is disconnected to send a signal for deactivating the compressor 1 to the engine control module 5 when the thermo switch 57 is off, whereby the evaporator temperature is returned to the control range.

On the other hand, when the fuel cut flag=1, it is determined that the deceleration fuel cut is in execution and an advance is made to Step S3.

Whether or not the compressor operation rate is being increased is determined in Step S3 and whether or not the compressor operation rate is being reduced is determined in Step S4. A compressor operation rate increase flag and a compressor operation rate reduction flag (both are initialized at zero when the engine is started) are introduced, and the compressor operation rate increase flag=0 and the compressor operation rate reduction flag=0 immediately after it is determined that the deceleration fuel cut is in execution. That is, an advance is made to Step S5 since the compressor operation rate is being neither increased nor reduced.

In Step S5, whether or not the vehicle speed V detected by a vehicle speed sensor (not shown) has dropped to or below the first permitted vehicle speed Vst is determined. Since the vehicle speed is detected and the first permitted vehicle speed is calculated in every control cycle here, "V (last time)" is the vehicle speed detected at the last control timing and "Vst (last time)" is the first permitted vehicle speed calculated at the last control timing. It should be noted that "V" is the vehicle speed detected at the current control timing and "Vst" is the first permitted vehicle speed calculated at the current control timing. In this case, if the vehicle speed V is not higher than the first permitted vehicle speed Vst and the last value "V (last time)" of the vehicle speed V is larger than the last value "Vst (last time)" of the first permitted vehicle speed Vst, it is determined that the vehicle speed has dropped to or below the first permitted vehicle speed and an advance is made to Step S6. Unless otherwise, it is determined that the vehicle speed has not dropped to or below the first permitted vehicle speed and an advance is made to Step S12.

In Steps S6, S7, in which vehicle speed region the vehicle speed V lies is determined. Here, four different vehicle speed regions are defined: <1> case where Vacrec<V<Vst, <2> case where Vrec<V≤Vacrec, <3> case where V≤Vrec and <4> case where V≥Vrec. Here, "V" is the vehicle speed detected by the vehicle speed sensor, "Vst" is the first permitted vehicle speed, "Vacrec" is the fuel cut recovery vehicle speed when the air conditioner is on and "Vrec" is the fuel cut recovery vehicle speed when the air conditioner is off. There is a relationship of Vst>Vacrec>Vrec among these three vehicle speeds.

In the case <1>, i.e. when the vehicle speed V is below the first permitted vehicle speed Vst, an advance is made from Step S6 to Step S9 to increase the compressor operation rate more than that before the vehicle speed V drops below the first permitted vehicle speed Vst. At this time, the compressor operation rate increase flag is set to 1. Here, that the "compressor operation rate is increased" means that an energization time to the electromagnetic clutch 2 per fixed time is made longer than that before the vehicle speed V drops below the first permitted vehicle speed Vst. Since the variable displacement type compressor is used in the present embodiment, the expression that the compressor operation rate is increased more than that before the vehicle speed V drops below the first permitted vehicle speed Vst is used. However, the following control is executed in the case of a fixed displacement type compressor. Specifically, in the case of the fixed displacement type compressor, the compressor 1 is forcibly turned on when the vehicle speed V drops below the first permitted vehicle speed Vst, assuming that the compressor 1 is turned off slightly before the vehicle speed V drops below the first permitted vehicle speed Vst. In this way, the evaporator temperature can be reduced and the evaporator cooling power can be increased. Step S8 which is not described yet is described later.

Since the compressor operation rate increase flag=1 (i.e. compressor operation rate is being increased) in Step S3 from the next time, an advance is made to Steps S3, S6 and S9 to keep the increase of the compressor operation rate as long as in the case <1>. In the case of the fixed displacement type compressor, the ON state of the compressor 1 is kept. This is to provide a vehicle speed condition for the first permitted vehicle speed Vst and set a period during which the compressor 1 is kept on (period during which the compressor operation rate is increased) as a period of the vehicle speed region of Vacrec<V<Vst. Here, since the first permitted vehicle speed Vst is set to depend on the assumed maximum deceleration as in the above equation (1), 80% (predetermined rate) of all the vehicle decelerations in the actual market are covered.

However, even in the vehicle speed region of Vacrec<V<Vst, the evaporator temperature may excessively drop and the evaporator 11 may be frozen if the compressor operation rate is increased also when the evaporator temperature is not higher than the second lower limit temperature Tlow. Here, the second lower limit temperature Tlow is set at a value lower than the above lower limit temperature Tevalo. Thus, when the evaporator temperature is not higher than the second lower limit temperature Tlow, the compressor operation rate is not increased more than that before the vehicle speed V drops below the first permitted vehicle speed Vst. Thus, in Step S8 before Step S9, the evaporator temperature Teva detected by the temperature sensor 52 and the second lower limit temperature Tlow are compared and an advance is made to Step S9 if the evaporator temperature Teva is above the second lower limit temperature Tlow. An advance is made from Step S8 to Step S12 if the evaporator temperature Teva is not higher than the second lower limit temperature Tlow.

If the vehicle speed V drops and the above case <2> is set, i.e. the vehicle speed V drops below the Vacrec, an advance is made to Step S11 via Steps S3, S6 and S7 and the compressor operation rate is reduced more than that before the vehicle speed V drops below the Vacrec. At this time, the compressor operation rate increase flag=0 and the compressor operation rate reduction flag=1. Here, that "the compressor operation rate is reduced" means that the energization time to the electromagnetic clutch 2 per fixed time is made shorter than that before the vehicle speed V drops below the Vacrec. Since the variable displacement type compressor is used in the present embodiment, the expression that the compressor operation rate is reduced more than that before the vehicle speed V drops below the first permitted vehicle speed Vst is used. However, the following control is executed in the case of a fixed displacement type compressor. Specifically, in the case of the fixed displacement type compressor, the compressor 1 is switched from the ON state to the OFF state when the vehicle speed V drops below Vacrec. In this way, the evaporator temperature can be increased and the evaporator cooling power can be reduced. Step S10 which is not described yet is described later.

From the next time, in Steps S3 and S4, the compressor operation rate increase flag=0 and the compressor operation rate reduction flag=1, i.e. the compressor operation rate is being reduced. At this time, an advance is made to Steps S3, S4, S7 and S11 and the reduction of the compressor operation rate is kept as long as in the above case <2>. In the case of the fixed displacement type compressor, the OFF state of the compressor 1 is kept. This is to set a period during which the compressor 1 is kept off (period during which the compressor operation rate is reduced more than that before the vehicle speed V drops below the Vacrec) as a period of the vehicle speed region of Vrec<V≤Vacrec.

However even in the period of the vehicle speed region of Vrec<V≤Vacrec, the evaporator temperature may rise and the evaporator cooling power may become insufficient if the compressor operation rate is reduced also when the evaporator temperature is not lower than a second upper limit temperature Thigh. Here, the second upper limit temperature Thigh is set at a value higher than the above upper limit temperature Tevahi. Thus, when the evaporator temperature is not lower than the second upper limit temperature Thigh, the compressor operation rate is not reduced more than that before the vehicle speed V drops below Vacrec. Thus, in Step S10 before Step S11, the evaporator temperature Teva detected by the temperature sensor 52 and the second upper limit temperature Thigh are compared and an advance is made to Step S11 if the evaporator temperature Teva is below the second upper limit temperature Thigh. An advance is made from Step S10 to Step S12 if the evaporator temperature Teva is not lower than the second upper limit temperature Thigh.

If the vehicle speed V drops and the above case <3> is set, i.e. the vehicle speed V drops below the Vacrec, an advance is made to Step S12 via Steps S3, S4 and S7. Further, in the above case <4>, i.e. if the vehicle speed V is above Vst, an advance is made to Step S12 via Steps S3, S4 and S5. In Step S12, the normal compressor operation rate is set, i.e., the compressor 1 is on/off controlled based on a signal from the thermo switch 57. At this time, the compressor operation rate reduction flag is set to 0.

Due to the compressor operation rate reduction flag=0 in Step S11, an advance is made to Steps S3, S4, S5 and S12 from the next time and the compressor 1 is on/off controlled based on a signal from the thermo switch 57.

Here, functions and effects of the present embodiment are described.

The present embodiment is provided with the refrigeration cycle R including the compressor 1 for sucking, compressing and discharging the refrigerant, the condenser 7 for condensing the high-temperature and high-pressure refrigerant discharged from the compressor 1, the expansion valve 10 for decompressing the refrigerant condensed in the condenser 7 and the evaporator 11 for evaporating the refrigerant through heat exchange between the refrigerant reduced in pressure by the expansion valve 10 and the surrounding air, and the engine control module 5 (vehicle deceleration fuel cut execution means) for executing the fuel cut during the deceleration of the vehicle. When the vehicle speed V drops below the first permitted vehicle speed Vst higher than the fuel cut recovery vehicle speed Vacrec when the air conditioner is on, at which the compressor 1 is actuated, during the deceleration of the vehicle, the compressor operation rate is increased more than that before the vehicle speed drops below the first permitted vehicle speed Vst (see Steps S2, S3, S4, S5, S6 and S9 and Steps S2, S3, S6 and S9 of FIG. 6). If the compressor operation rate can be increased more than that before the vehicle speed drops below the first permitted vehicle speed before the fuel cut recovery vehicle speed Vacrec when the air conditioner is on is reached, a reduction in the cooling power of the evaporator 11 before the fuel cut recovery vehicle speed Vacrec when the air conditioner is on is reached can be suppressed. However, the vehicle deceleration is normally not constant, but rather varies. Thus, depending on the vehicle deceleration, the fuel cut recovery vehicle speed Vacrec when the air conditioner is on may be reached while a time for increasing the cooling power of the evaporator remains insufficient. On the other hand, since the first permitted vehicle speed Vst higher than the fuel cut recovery vehicle speed Vacrec when the air conditioner is on is set according to the present embodiment, it is possible to gain a time required to ensure the evaporator cooling power in the vehicle speed region from Vst to Vacrec. This enables sufficient evaporator cooling power to be ensured even if the vehicle deceleration differs in the actual market.

Since the first permitted vehicle speed Vst is a value set based on the fuel cut recovery vehicle speed Vacrec when the air conditioner is on and the cooling necessary time tac (time required to ensure the evaporator cooling power) and the predetermined assumed maximum deceleration (see the above equation (1)) according to the present embodiment, 80% (predetermined rate) of all the decelerations in the actual market can be covered by the assumed maximum deceleration.

Second Embodiment

The first embodiment is targeted at the case where the vehicle is decelerated only by releasing the accelerator pedal, i.e. the vehicle deceleration is relatively large. The vehicle is decelerated not only be releasing the accelerator pedal, but also by releasing the accelerator pedal and depressing a brake pedal in some cases. Here, a switch from the accelerator pedal to the brake pedal is hereinafter merely referred to as "pedal switching" below. A case where the vehicle is decelerated only by releasing the accelerator pedal and a case where the vehicle is decelerated by pedal switching are different scenes. Accordingly, in the second embodiment, a second permitted vehicle speed Vstoff which is a permitted vehicle speed at the time of pedal switching is introduced in addition to the above first permitted vehicle speed Vst, considering a difference between the scenes. Specifically, the second permitted vehicle speed Vstoff is determined by adding a requirement that the compressor 1 can be kept on for a predetermined time tac (e.g. about several seconds) even if the vehicle is decelerated at an assumed maximum deceleration including a pedal switching time. Here, the assumed maximum deceleration including the above pedal switching time is referred to as a "second assumed maximum deceleration" below. In other words, the second permitted vehicle speed Vstoff can be calculated by the following equation with reference to the above equation (1).

$$Vstoff = Vacrec + \text{second assumed maximum deceleration} \times tac \qquad (2)$$

where tac: cooling necessary time.

Here, the second assumed maximum deceleration on the right side of the equation (2) is set similarly to the assumed maximum deceleration of the first embodiment.

Figure 7:
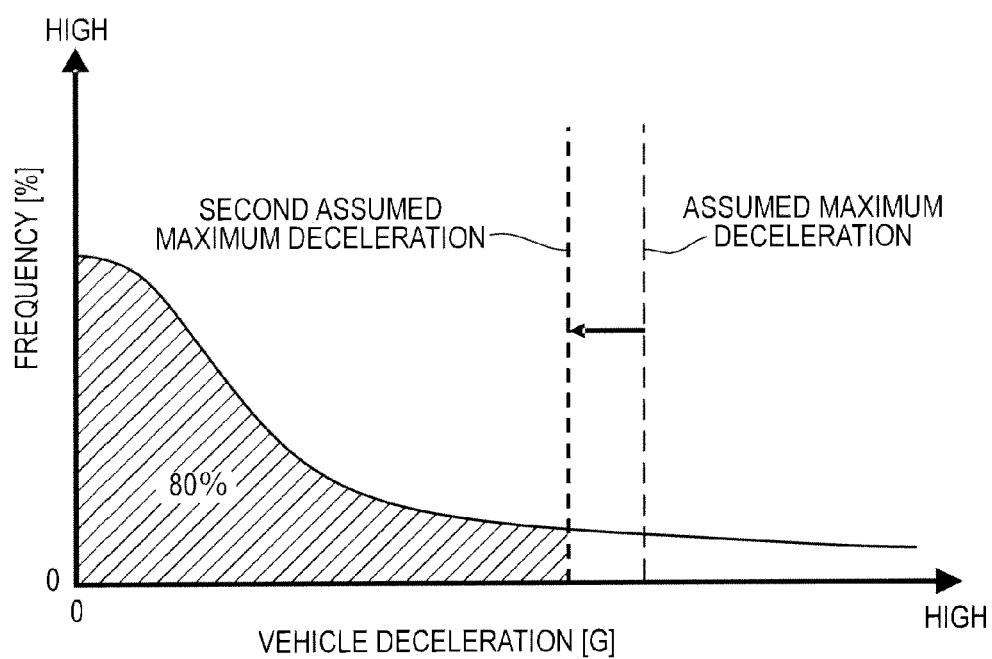
FIG. 7 is a characteristic graph of a frequency distribution in relation to vehicle deceleration caused by pedal switching according to a second embodiment.

FIG. 7 shows a frequency distribution in relation to vehicle deceleration obtained by compiling data actually collected through a market research on how vehicles are decelerated by pedal switching. Also in the second embodiment, the vehicle deceleration is treated as an absolute value. That is, the vehicle deceleration on a horizontal axis of FIG. 7 increases as the vehicle is more rapidly decelerated. Since it is not realistic to cover all vehicle decelerations including the pedal switching time in an actual market, a deceleration at a position to cover decelerations up to 80% (predetermined rate) from a low side is set as a "second assumed maximum deceleration" when the entire area of the frequency distribution is 100% in FIG. 7. The second assumed maximum deceleration is a value smaller than the assumed maximum deceleration of the first embodiment. Although the predetermined rate is set at 80% here, there is no limitation to this rate.

Since Vacrec on the right side of the above equation (2) is dependent on the refrigerant pressure as described above with reference to FIG. 5, the second permitted vehicle speed Vstoff is also set according to the refrigerant pressure as shown by broken line in an overlapping manner in FIG. 5. Specifically, the second permitted vehicle speed Vstoff is set to be higher in a region where the refrigerant pressure is relatively high than in a region where the refrigerant pressure is relatively low. The second permitted vehicle speed Vstoff is lower than the above second permitted vehicle speed Vst due to the need for the pedal switching time and a time until the second assumed maximum deceleration is reached after the depression of the brake pedal is started.

Figure 8:
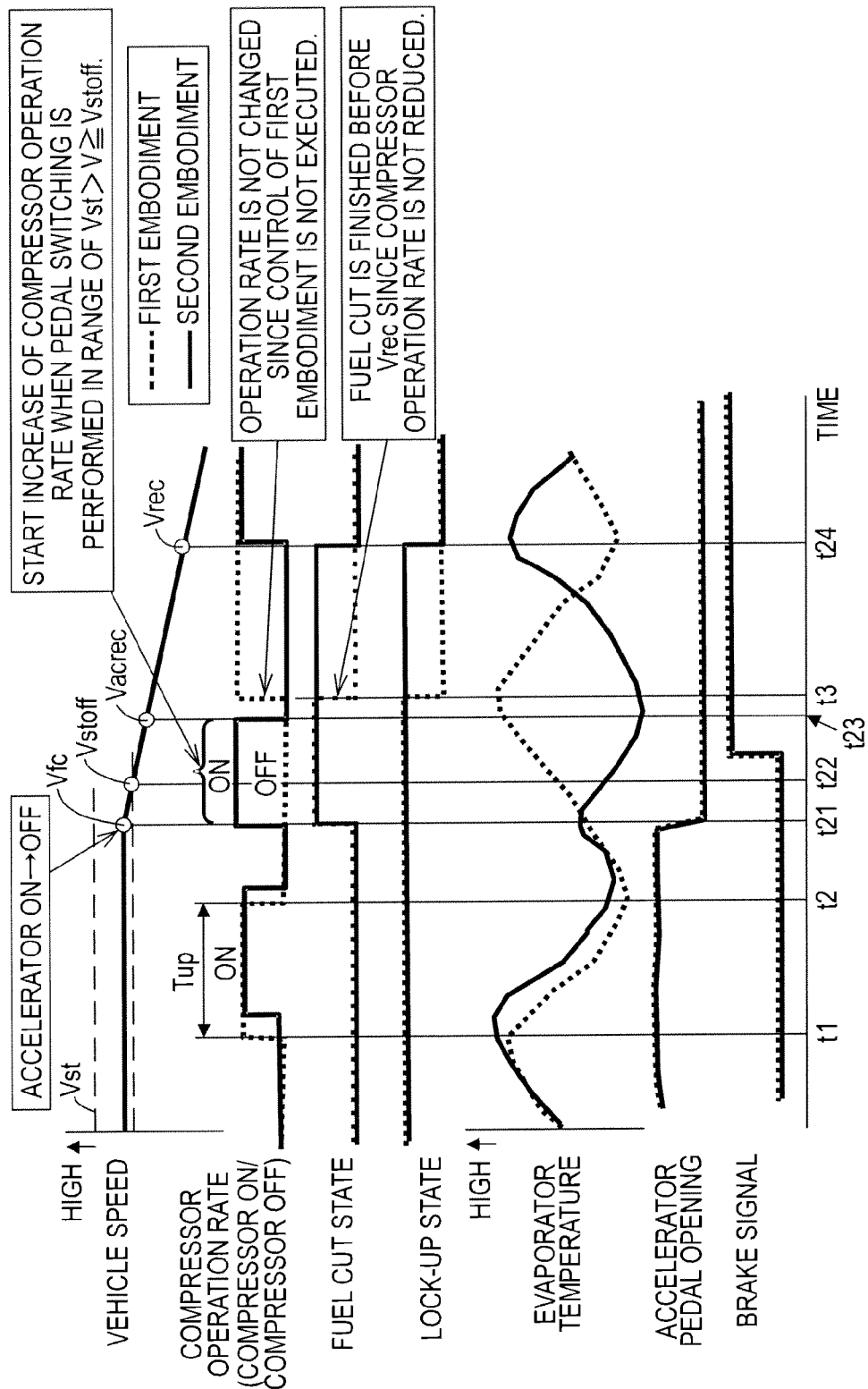
FIG. 8 is a timing chart showing changes of a vehicle speed, a compressor operation rate, an evaporator temperature and the like during a deceleration fuel cut of the second embodiment.

Functions of the second embodiment in the case of using the second permitted vehicle speed Vstoff are described with reference to FIG. 8. A timing chart of FIG. 8 shows how the vehicle speed, the compressor operation rate, the evaporator temperature and the like change during the deceleration fuel cut by models. Changes in the case of the first embodiment are shown by broken line and those in the case of the second embodiment are shown by solid line. Also in the second embodiment, a case of a fixed displacement type compressor is mainly shown in the second row of FIG. 8. In the case of a variable displacement type compressor, "ON" has only to be replaced by a relative increase of the compressor operation rate and "OFF" has only to be replaced by a relative reduction of the compressor operation rate.

As shown in the uppermost row of FIG. 8, the first embodiment is not applied when the vehicle is decelerated in a vehicle speed region below the first permitted vehicle speed Vst. This is because an advance is made not to Step S6, but to Step S12 since the vehicle speed V is below the first permitted vehicle speed Vst even if it is determined in Step S2 of FIG. 6 that the deceleration fuel cut is in execution and an advance is made to Step S5. Thus, in the first embodiment, only the compressor 1 is on/off controlled based on a signal from the thermo switch 57 as shown by broken line in the second row of FIG. 8. If the vehicle is decelerated in the vehicle speed region below Vst, the fuel cut is finished at t3 before the fuel cut recovery vehicle speed Vrec when the air conditioner is off is reached.

On the other hand, in the second embodiment, the compressor operation rate is increased more than that before pedal switching if a vehicle speed at a pedal switching timing (Vfc) is higher than the second permitted vehicle speed Vstoff when the vehicle is decelerated by pedal switching from the accelerator pedal to the brake pedal during the travel of the vehicle in a vehicle speed region below the first permitted vehicle speed Vst and not below second permitted vehicle speed Vstoff. In other words, the compressor 1 is forcibly turned on at timing t21 at which the vehicle is decelerated by pedal switching in the vehicle speed region of Vst>V≥Vstoff. In this case, a timing at which the ON state of the compressor 1 is forcibly finished is as in the first embodiment, i.e. timing t23 at which the vehicle speed V reaches the fuel cut recovery vehicle speed Vacrec when the air conditioner is on. When the vehicle speed drops and reaches the fuel cut recovery vehicle speed Vacrec when the air conditioner is on, the compressor 1 is returned to the OFF state as in the first embodiment in a vehicle speed region up to the fuel cut recovery vehicle speed Vrec when the air conditioner is off.

As just described, in the second embodiment, the compressor 1 is forcibly turned on also when the vehicle is decelerated by pedal switching in the vehicle speed region below Vst. Thus, the evaporator temperature drops from t21, wherefore a fuel cut state can be maintained up to Vrec.

Figure 9:
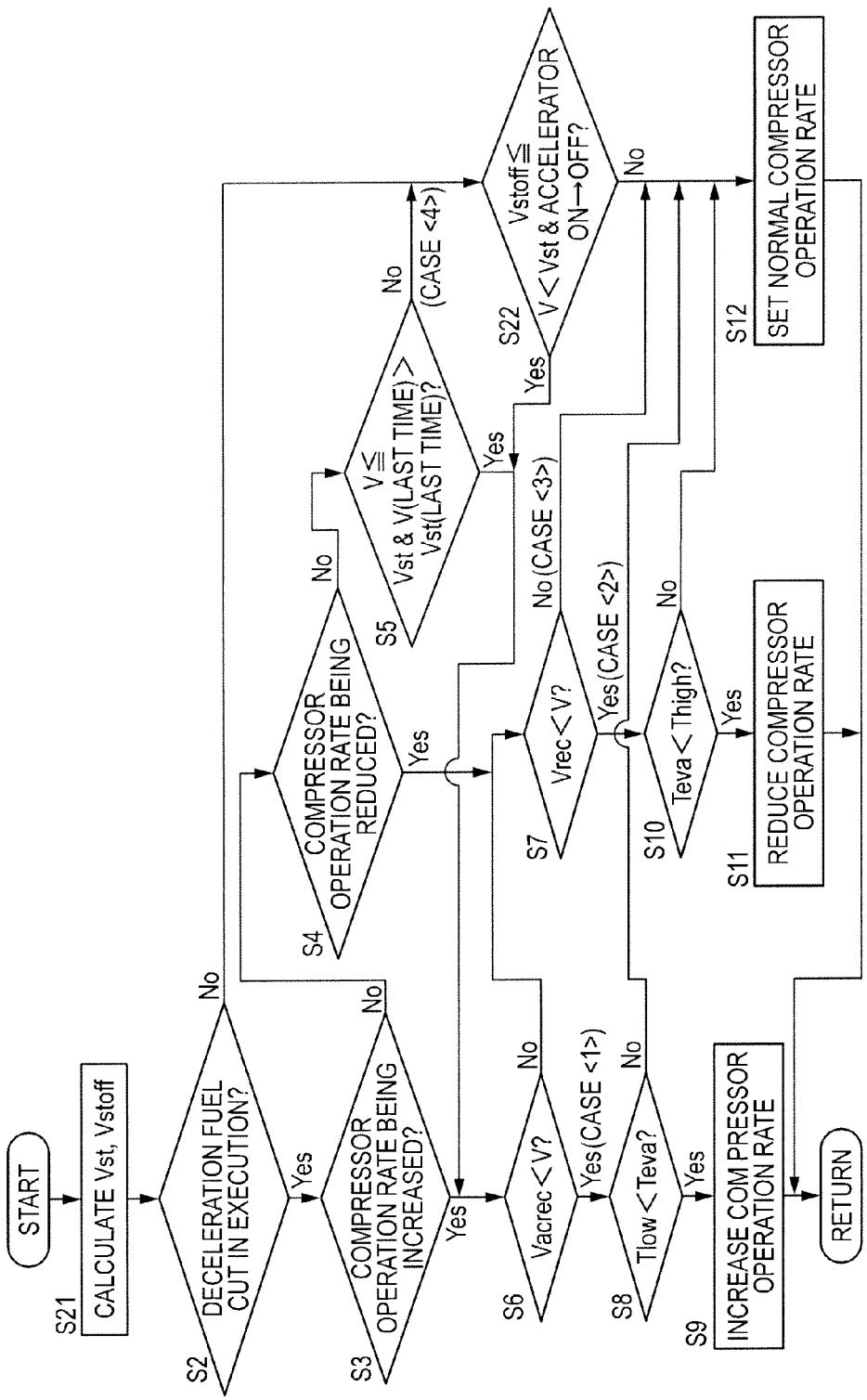
FIG. 9 is a flow chart showing a control of a compressor during the deceleration fuel cut of the second embodiment.

A flow chart of FIG. 9 is for controlling the compressor 1 during the deceleration fuel cut of the second embodiment and executed at regular time intervals (e.g. every 10 ms). The same parts as in FIG. 6 of the first embodiment are denoted by the same Step numbers.

FIG. 9 differs from FIG. 6 of the first embodiment in Steps S21 and S22. Parts different from the first embodiment are mainly described below.

In Step S21, the first permitted vehicle speed Vst and the second permitted vehicle speed Vstoff are calculated by searching a table having FIG. 5 as contents based on the refrigerant pressure detected by the refrigerant pressure sensor 54. As shown in FIG. 5, the second permitted vehicle speed Vstoff is a value lower than the first permitted vehicle speed Vst. Further, similar to the first permitted vehicle speed Vst, the second permitted vehicle speed Vstoff is also a value which is higher in the region where the refrigerant pressure is relatively high than in the region where the refrigerant pressure is relatively low according to the refrigerant pressure. This is because Vstoff is also dependent on the refrigerant pressure since Vstoff is determined in dependence on Vacrec by the above equation (2) and Vacrec is dependent on the refrigerant pressure.

In Step S2, whether or not the deceleration fuel cut is in execution is determined. Unless the deceleration fuel cut is in execution, an advance is made to Step S22 to determine whether or not the vehicle speed V is in the vehicle speed region below the first permitted vehicle speed Vst and not below the second permitted vehicle speed Vstoff and pedal switching has been performed. Here, it is determined that pedal switching has been performed when the accelerator pedal is released (accelerator OFF) from a state where the accelerator pedal is depressed (accelerator ON). Of course, it may be determined that pedal switching has been performed when a transition has been made from the state where the accelerator pedal is depressed to the state where the accelerator pedal is released and the depression of the brake pedal is detected. An advance is made to Step S12 unless the vehicle speed V is in the vehicle speed region below the first permitted vehicle speed Vst and not below the second permitted vehicle speed Vstoff and pedal switching has been performed, and the compressor 1 is on/off controlled based on a signal from the thermo switch 57.

On the other hand, an advance is made to Step S6 and subsequent Steps if the vehicle speed V is in the vehicle speed region below the first permitted vehicle speed Vst and not below the second permitted vehicle speed Vstoff and pedal switching has been performed in Step S22. In the first embodiment, an advance is made to Step S6 and subsequent Steps when the determination of Step S5 is Yes. On the other hand, in the second embodiment, an advance to Step S6 and subsequent Steps is made also when the determination of Step S22 is Yes. That is, a chance of proceeding to Step S6 and subsequent Steps is increased more than in the first embodiment. Here, as shown in the uppermost row of FIG. 8, a case where the determination of Step S22 is Yes is a case where the vehicle is decelerated by pedal switching at timing t21 when the vehicle travels in the vehicle speed region below Vst and not below Vstoff by depressing the accelerator pedal.

If the vehicle speed V is above Vacrec in Step S6, an advance is made to Step S9 and the compressor operation rate is increased more than that before pedal switching. At this time, the compressor operation rate increase flag is set to 1. Since the variable displacement type compressor is used also in the second embodiment, the expression that the compressor operation rate is increased more than that before pedal switching is used. However, the following control is executed in the case of a fixed displacement type compressor. Specifically, in the case of the fixed displacement type compressor, the compressor 1 is forcibly turned on when pedal switching is performed, assuming that the compressor 1 is turned off slightly before pedal switching. In this way, the evaporator temperature can be reduced and the evaporator cooling power can be increased.

Since the compressor operation rate increase flag=1 (i.e. compressor operation rate is being increased) in Step S3 from the next time, an advance is made to Steps S3, S6 and S9 to keep the increase of the compressor operation rate. In the case of the fixed displacement type compressor, the ON state of the compressor 1 is kept. This is to set a period during which the compressor 1 is forcibly kept on (period during which the compressor operation rate is increased) when pedal switching is performed in the vehicle speed region below Vst and not below Vstoff as a period of a vehicle speed region from the vehicle speed at which pedal switching is performed to Vacrec.

It should be noted that an advance is made to Step S22 also when the compressor operation rate is neither increased or reduced and the vehicle speed V has not dropped to or below the first permitted vehicle speed Vst in Steps S3, S4 and S5 when the deceleration fuel cut is in execution.

As just described, according to the second embodiment, the compressor operation rate is increased more than that before pedal switching if the vehicle speed V at the pedal switching timing is higher than the second permitted vehicle speed Vstoff, which is a vehicle speed lower than the first permitted vehicle speed Vst and higher than the fuel cut recovery vehicle speed Vacrec when the air conditioner is on, when the vehicle is decelerated by pedal switching from the accelerator pedal to the brake pedal during the travel of the vehicle at the vehicle speed lower than the first permitted vehicle speed Vst (see Steps S2, S22, S6 and S9, Steps S2, S3, S6 and S9 of FIG. 9). In this way, the compressor operation rate can be increased and a chance of ensuring the evaporator cooling power can be increased also when the vehicle is decelerated by pedal switching at the vehicle speed lower than the first permitted vehicle speed Vst.

According to the second embodiment, the second permitted vehicle speed Vstoff is a value set based on the fuel cut recovery vehicle speed Vacrec when the air conditioner is on, the cooling necessary time tac (time required to ensure the evaporator cooling power) and the second assumed maximum deceleration, which is a value smaller than the assumed maximum deceleration (see the above equation (2)). Thus, it is possible to cover 80% (predetermined rate) of all the decelerations in the actual market when the vehicle is decelerated by pedal switching.

Third Embodiment

Figure 10:
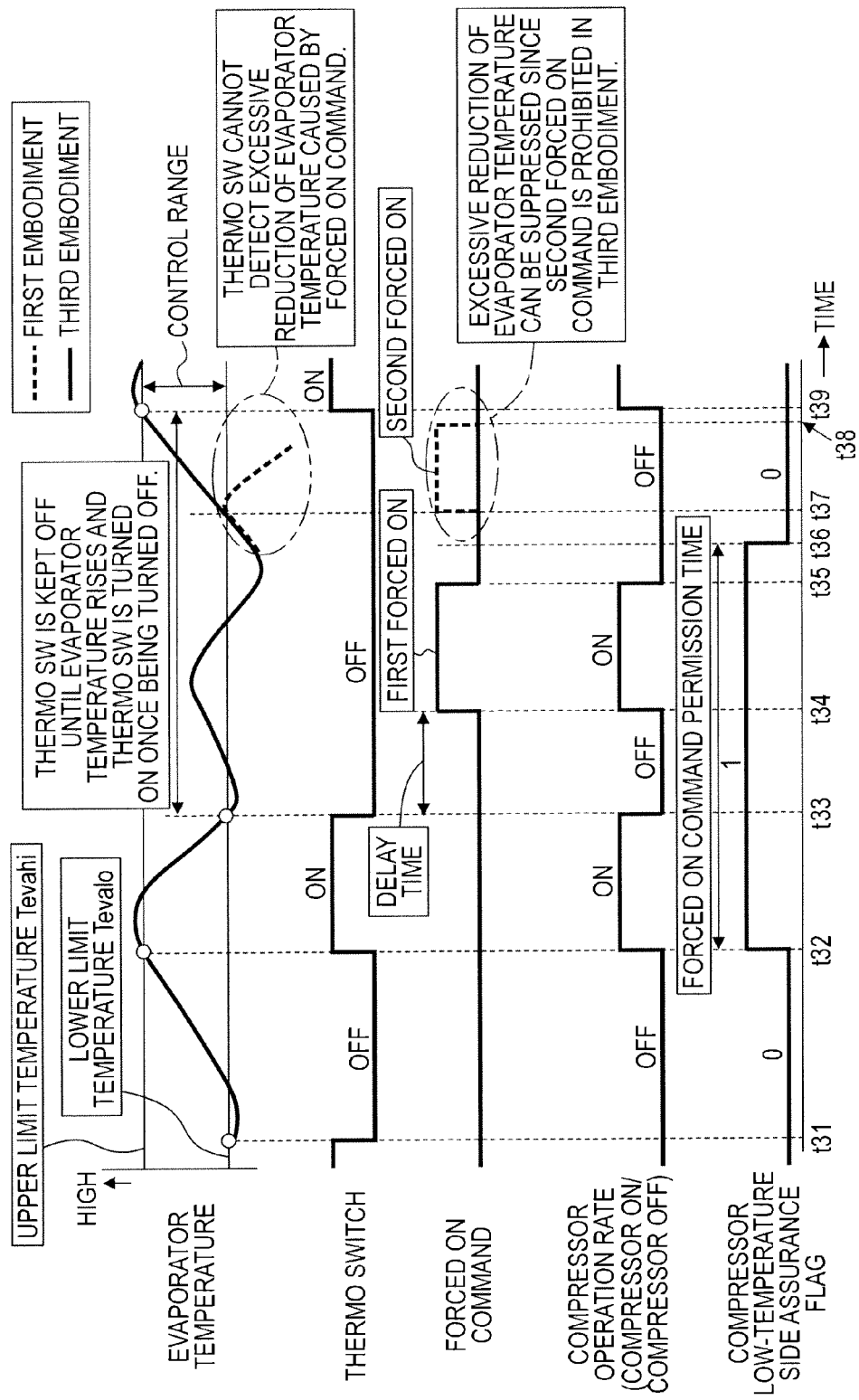
FIG. 10 is a timing chart showing changes of an evaporator temperature, a thermo switch, a compressor operation rate and the like during a normal operation of a third embodiment.

A timing chart of FIG. 10 shows how the evaporator temperature, the thermo switch (thermo SW) 57, the compressor operation rate and the like change mainly during a normal operation in a third embodiment by models. Changes in the case of the first embodiment are shown by broken line and those in the case of the third embodiment are shown by solid line.

As shown in FIG. 10, the thermo switch 57 is turned off at each of timings t31, t33 at which the evaporator temperature drops below the lower limit temperature Tevalo, and turned on at each of timings T32, T38 at which the evaporator temperature rises above the lower limit temperature Tevahi. As described above, the control amplifier 51 returns the evaporator temperature to the control range by connecting the electromagnetic clutch 2 and sending a signal for actuating the compressor 1 to the engine control module 5 when the thermo switch 57 is on. On the other hand, when the thermo switch 57 is off, the evaporator temperature is returned to the control range by disconnecting the electromagnetic clutch 2 and sending a signal for deactivating the compressor 1 to the engine control module 5.

The third embodiment is also described, taking a fixed displacement type compressor as an example. It is assumed that a command to forcibly turn on the compressor 1 (this command is hereinafter referred to as a "forced ON command") is permitted at timing t34 after t33 at which the thermo switch 57 is turned off. The evaporator temperature that has risen thus far is thought to turn to drop and drop below the lower limit temperature Tevalo again by permitting this forced ON command. The forced ON command means to forcibly set the compressor 11 in the ON state for a fixed period (compressor operation rate is relatively increased more than before for the fixed period) without based on a signal from the thermo switch 57.

Next, if it is assumed that the forced ON command is permitted at t37, the evaporator temperature is thought to largely drop below the lower limit temperature Tevalo in response to the second forced ON command (see broken line in the uppermost row of FIG. 10).

Here, as shown in the third row of FIG. 10, the force ON command is prohibited for a period until a delay time elapses after timing t33 at which the thermo switch 57 is turned off. This is because the evaporator temperature is thought to largely drop from the lower limit temperature Tevalo only in response to the first forced ON command if the first forced ON command is permitted following timing t33 at which the thermo switch 57 is turned off. On the other hand, if the delay time that elapses from timing t33 is provided, the evaporator temperature is supposed to turn to rise and rise above the lower limit temperature Tevalo during this delay time. If the forced ON command is permitted after the evaporator temperature turns to rise (i.e. after the delay time), the evaporator temperature does not largely drop below the lower limit temperature Tevalo. As just described, if only the first forced ON command is permitted, the evaporator is thought to be not frozen even if the evaporator temperature drops below the lower limit temperature Tevalo. However, if the second and subsequent forced ON commands are also permitted following the first forced ON command, it is thought that the evaporator temperature largely drops below the lower limit temperature Tevalo and the evaporator 11 is frozen.

If the evaporator 11 experiences an excessive temperature drop below the lower limit temperature Tevalo, the thermo switch 57 is kept off until the evaporator temperature rises and the thermo switch 57 is turned on after being turned off at t33. Thus, the thermo switch 57 cannot detect a reduction of the evaporator temperature caused by the first forced ON command from t34 to t35, let alone a reduction of the evaporator temperature caused by the second forced ON command from t37 to t38.

Accordingly, in the third embodiment, the second and subsequent forced ON commands (increase of the compressor operation rate) are prohibited until the thermo switch 57 is switched from off to on after the first forced ON command is permitted (after the compressor operation rate is increased).

This is specifically described with reference to FIG. 10. In the third embodiment, as shown in the lowermost row of FIG. 10, a compressor low-temperature side assurance flag is newly introduced. The compressor low-temperature side assurance flag is switched from zero to 1 at timing t32 at which the thermo switch 57 is switched from off to on. The forced ON command is permitted only when the compressor low-temperature side assurance flag=1. Conversely, the forced ON command is prohibited when the compressor low-temperature side assurance flag=0.

An end of a period during which the compressor low-temperature side assurance flag=1 is set at a timing after t35, e.g. t36 so that the first forced ON command after t34 is permitted, but the second forced ON command from t37 to t38 is prohibited. By introducing the compressor low-temperature side assurance flag that is set to 1 at a timing at which the thermo switch 57 is switched from off to on (t32) in this way, the second and subsequent forced ON commands can be prohibited until the thermo switch 57 is switched from off to on after the first forced ON command is permitted.

Figure 11A:
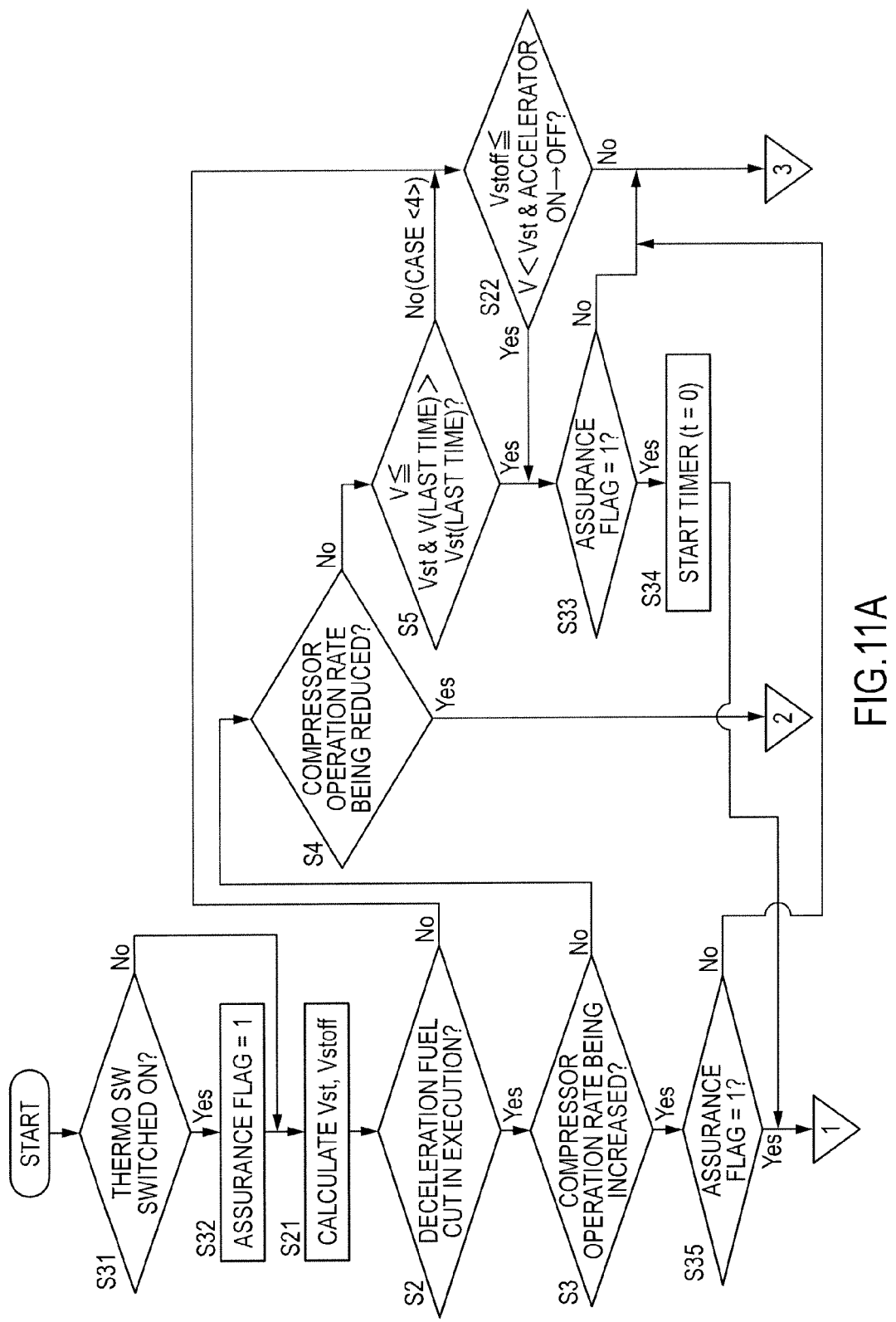
FIG. 11A is a flow chart showing a control of a compressor during a deceleration fuel cut of the third embodiment.
Figure 11B:
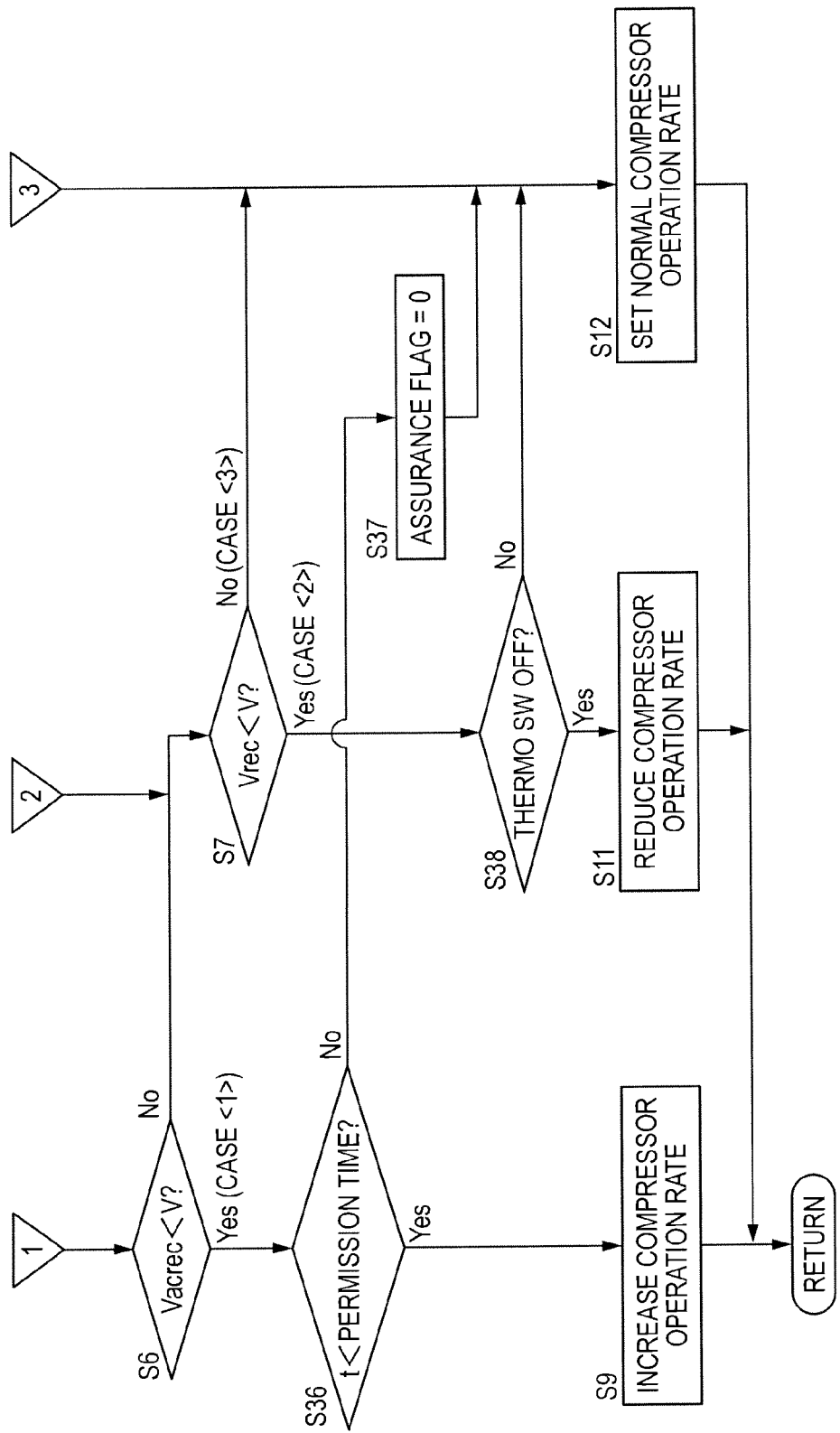
FIG. 11B is a flow chart showing the control of the compressor during the deceleration fuel cut of the third embodiment.

A flow chart of FIGS. 11A and 11B is for controlling the compressor 1 during the deceleration fuel cut of the third embodiment and executed at regular time intervals (e.g. every 10 ms). The same parts as in FIG. 9 of the second embodiment are denoted by the same Step numbers. It should be noted that although the period during the deceleration fuel cut is not necessarily targeted in FIG. 10, the concept described with reference to FIG. 10 is applied to the period during the deceleration fuel cut.

FIGS. 11A and 11B differ from FIG. 9 of the second embodiment in Steps S31 to S37. Parts different from the second embodiment are mainly described below.

In Step S31 of FIG. 11A, it is determined whether or not the present timing is a timing at which the thermo switch 57 is switched from off to on. An advance is made to Step S32 at the timing at which the thermo switch 57 is switched from off to on, and the compressor low-temperature side assurance flag (initialized at zero when the engine is started) is set to 1. Step S32 is skipped if the present timing is not the timing at which the thermo switch 57 is switched from off to on. The value of this compressor low-temperature side assurance flag is stored in a memory.

An advance is made to Steps S3, S4 and S5 during the deceleration fuel cut and an advance is made to Step S33 if the vehicle speed V drops across the first permitted vehicle speed Vst in Step S5. Alternatively, an advance is made from Step S2 to S22 unless the deceleration fuel cut is in execution, and an advance is made to Step S33 if the vehicle speed V is in the vehicle speed region below the first permitted vehicle speed Vst and not below the second permitted vehicle speed Vstoff and pedal switching has been performed.

In Step S33, the compressor low-temperature side assurance flag is checked. If the compressor low-temperature side assurance flag=1, an advance is made to Step S34 to start a timer (timer value t=0) and, then, to Step S6 of FIG. 11B. This timer is for measuring an elapsed time from the timing at which the thermo switch 57 is switched from off to on.

If the vehicle speed V is above the fuel cut recovery vehicle speed Vacrec in Step S6 of FIG. 11B, an advance is made to Step S36 to compare the timer value t and a forced ON command permission time. Here, the forced ON command permission time is set in advance, considering the delay time and an execution time of the first forced ON command. For example, a period of several seconds (e.g. about 5 seconds) is set as the forced ON command permission time. Immediately after the timer is started, an advance is made to Step S9 since the timer value t is below the forced ON command permission time. If the determination of Step S5 is Yes and an advance is made to Step S9, the compressor operation rate is increased more than that before the vehicle speed drops below the first permitted vehicle speed Vst. On the other hand, if the determination of Step S22 is Yes and an advance is made to Step S9, the compressor operation rate is increased more than that before pedal switching. At this time, the compressor operation rate increase flag is set to 1.

Since the variable displacement type compressor is used also in the third embodiment, the expression that the compressor operation rate is increased more than that before the vehicle speed drops below the first permitted vehicle speed Vst or before pedal switching is used. However, the following control is executed in the case of a fixed displacement type compressor. Specifically, in the case of the fixed displacement type compressor, the compressor 1 is forcibly turned on when the vehicle speed V drops below the first permitted vehicle speed Vst, assuming that the compressor 1 is turned off slightly before the vehicle speed drops below the first permitted vehicle speed Vst. Alternatively, the compressor 1 is forcibly turned on when pedal switching is performed, assuming that the compressor 1 is turned off slightly before pedal switching. In this way, the evaporator temperature can be reduced and the evaporator cooling power can be increased.

Since the compressor operation rate increase flag=1 in Step S9, an advance is made from Step S3 of FIG. 11A to Step S35 next time. Since the compressor low-temperature side assurance flag=1 in Step S35, an advance is made to Steps S6 and S36 of FIG. 11B to compare the timer value t and the forced ON command permission time. An advance is made to Step S9 to keep the increase of the compressor operation rate while the timer value t is below the forced ON command permission time. In the case of the fixed displacement type compressor, the ON state of the compressor 1 is kept.

If the timer value t is not below the forced ON command permission time in Step S36 of FIG. 11B, an advance is made to Step S37 to set the compressor low-temperature side assurance flag to 0 and then to Step S12 to set the normal compressor operation rate.

An advance is made to Step S33 if the determination of Step S5 or S22 becomes Yes again during the same deceleration fuel cut thereafter. However, since the compressor low-temperature side assurance flag=0, an advance is not made to Step S34. There is thought to be no chance of making determination Yes twice at shifted timings in Step S5 or Step S22 during the first deceleration fuel cut. However, if erroneous determination is included, the determination Yes may be made twice at shifted timings. Even if the second determination Yes is made in Step S5 or S22 during the first deceleration fuel cut, the second increase of the compressor operation rate (forced ON command) is prohibited.

On the other hand, if the vehicle speed reaches Vacrec during the deceleration fuel cut, an advance is made to Steps S2, S3 and S4 of FIG. 11A and Step S7 of FIG. 11B. If the vehicle speed is above the fuel cut recovery vehicle speed Vrec when the air conditioner is off in Step S7, an advance is made to Step S38 to determine whether or not the thermo switch 57 is off. As shown in FIG. 10, in the case of the fixed displacement type compressor, the compressor 1 is turned off when the thermo switch 57 is off and turned on when the thermo switch 57 is on as a general rule. According to this general rule, the thermo switch 57 is supposed to be off in the case of the fixed displacement type compressor since the compressor 1 is turned off in Step S11. Since a case where the thermo switch 57 is on in Step S38 is theoretically conceivable, Step S38 is added. Since the general rule is followed if the thermo switch 57 is off in Step S38, an advance is made to Step S11 to reduce the compressor operation rate more than that before the vehicle speed V drops and reaches Vrec. In the case of the fixed displacement type compressor, the compressor 1 is turned off.

On the other hand, if the compressor operation rate is reduced more than that before the vehicle speed drops and reaches Vrec also when the thermo switch 57 is on in Step S38, the evaporator temperature rises. To avoid this, an advance is made to Step S12.

The thermo switch 57 is kept off until the evaporator temperature rises to or above the upper limit temperature Tevahi thereafter once the evaporator temperature drops to or below the lower limit temperature Tevalo and the thermo switch 57 is turned off. Thus, the evaporator temperature may excessively drop below the lower limit temperature Tevalo and the evaporator 11 may be frozen if the forced ON command is repeatedly permitted in the state where the thermo switch 57 is off during the deceleration of the vehicle. On the other hand, according to the third embodiment, the thermo switch 57 is provided which is turned on when the evaporator temperature rises and reaches the upper limit temperature Tevahi and turned off when the evaporator temperature drops and reaches the lower limit temperature Tevalo, and the second and subsequent forced ON commands (increase of the compressor operation rate) are prohibited until the thermo switch 57 is switched from off to on after the first forced ON command (after the compressor operation rate is increased) (see Steps S31, S32, S2, S3, S4, S5, S22, S33 and S34 of FIG. 11A, Steps S6, S36 and S9 of FIG. 11B, Steps S2, S3 and S35 of FIG. 11A, Steps S6, S36, S9 of FIG. 11B, Steps S2, S3 and S35 of FIG. 11A, Steps S6, S36, S37 and S12 of FIG. 11B, Steps S2, S3, S4, S5, S22 and S33 of FIG. 11A, Step S12 of FIG. 11B). Thus, the evaporator temperature does not largely drop below the lower limit temperature Tevalo and the freezing of the evaporator 11 can be avoided.

In the first embodiment, the second lower limit temperature Tlow for preventing the freezing of the evaporator in Step S8 of FIG. 6 and the second upper limit temperature Thigh for preventing the deterioration of air conditioning performance in Step S8 (Tlow, Thigh are both threshold values) are provided, and a control is executed so that the evaporator temperature does not change beyond each threshold value. This is premised on the vehicle including the temperature sensor 52 for detecting the evaporator temperature, but the present invention is applicable also to vehicles in which a temperature control is executed by a thermostat.

In the present embodiments, the case where the fuel cut recovery timing is the fuel cut recovery vehicle speed is described. This is because whether or not an engine stall occurs can be determined based on the vehicle speed. Another parameter may be used provided that it is a parameter capable of determining whether or not an engine stall occurs. For example, the fuel cut recovery timing may be a fuel cut recovery rotation speed.

The present invention is not limited to the embodiments described above.

The present application claims a priority of Japanese Patent Application No. 2012-142720 filed with the Japan Patent Office on Jun. 26, 2012, all the contents of which are hereby incorporated by reference.

The invention claimed is:

1. An air conditioning device for a vehicle, comprising:
a refrigeration cycle including a compressor configured to suck, compress and discharge refrigerant, a condenser configured to condense the refrigerant discharged from the compressor, an expansion valve configured to decompress the refrigerant condensed in the condenser and an evaporator configured to evaporate the refrigerant through heat exchange between the refrigerant reduced in pressure by the expansion valve and surrounding air;
a fuel cut execution unit configured to execute a fuel cut during deceleration of the vehicle so as to cut supply of fuel to an engine of the vehicle while the vehicle is moving; and
a control unit configured to increase, when a vehicle speed drops below a first permitted vehicle speed during the deceleration of the vehicle, an operation rate of the compressor for a predetermined period so as to become more than the operation rate of the compressor before the vehicle speed drops below the first permitted vehicle speed, the first permitted vehicle speed being higher than a fuel cut recovery vehicle speed when an air conditioner is on, the compressor being actuated when the vehicle speed drops below the fuel cut recovery vehicle speed and the air conditioner is on, the predetermined period corresponding to a period between a first time when the vehicle speed drops below the first permitted vehicle speed and a second time immediately before the vehicle speed drops below the fuel cut recovery vehicle speed.

2. The air conditioning device for a vehicle according to claim 1, wherein:
the first permitted vehicle speed is a value set based on the fuel cut recovery vehicle speed when the air conditioner is on, a third time required to ensure cooling power of the evaporator and a predetermined assumed maximum deceleration.

3. The air conditioning device for a vehicle according to claim 1, wherein:
the control unit is configured to increase the operation rate of the compressor more than the operation rate before pedal switching if a vehicle speed at a pedal switching timing is higher than a second permitted vehicle speed, the second permitted vehicle speed being lower than the first permitted vehicle speed and higher than the fuel cut recovery vehicle speed when the air conditioner is on, when the vehicle is decelerated by the pedal switching from an accelerator pedal to a brake pedal during travel of the vehicle at a vehicle speed lower than the first permitted vehicle speed.

4. The air conditioning device for a vehicle according to claim 3, wherein:
the first permitted vehicle speed is a value set based on the fuel cut recovery vehicle speed when the air conditioner is on, a third time required to ensure cooling power of the evaporator and a predetermined assumed maximum deceleration, and
the second permitted vehicle speed is a value set based on the fuel cut recovery vehicle speed when the air conditioner is on, the third time required to ensure cooling power of the evaporator and a second assumed maximum deceleration which is a value smaller than the predetermined assumed maximum deceleration.

5. The air conditioning device for a vehicle according to claim 1, comprising:
a thermo switch configured to be turned on when a temperature of the evaporator rises and reaches an upper limit temperature and configured to be turned off when the temperature of the evaporator drops and reaches a lower limit temperature,
wherein the control unit is configured to prohibit an increase of the operation rate of the compressor until the thermo switch is switched from off to on after the operation rate of the compressor is increased.

6. An air conditioning control method for a vehicle, the vehicle comprising
a refrigeration cycle including a compressor configured to suck, compress and discharge refrigerant, a condenser configured to condense the refrigerant discharged from the compressor, an expansion valve configured to decompress the refrigerant condensed in the condenser and an evaporator configured to evaporate the refrigerant through heat exchange between the refrigerant reduced in pressure by the expansion valve and surrounding air; and
a fuel cut execution unit configured to execute a fuel cut during deceleration of the vehicle so as to cut supply of fuel to an engine of the vehicle while the vehicle is moving,
wherein the method comprises:
increasing, when a vehicle speed drops below a first permitted vehicle speed during the deceleration of the vehicle, an operation rate of the compressor for a predetermined period so as to become more than the operation rate of the compressor before the vehicle speed drops below the first permitted vehicle speed, and
actuating the compressor when the vehicle speed drops below a fuel cut recovery vehicle speed and an air conditioner is on, the first permitted vehicle speed being higher than the fuel cut recovery vehicle speed when the air conditioner is on,
wherein the predetermined period corresponds to a period between a first time when the vehicle speed drops below the first permitted vehicle speed and a second time immediately before the vehicle speed drops below the fuel cut recovery vehicle speed.

7. An air conditioning device for a vehicle, comprising:
a refrigeration cycle including a compressor configured to suck, compress and discharge refrigerant, a condenser configured to condense the refrigerant discharged from the compressor, an expansion valve configured to decompress the refrigerant condensed in the condenser and an evaporator configured to evaporate the refrigerant through heat exchange between the refrigerant reduced in pressure by the expansion valve and surrounding air;
a fuel cut execution unit configured to execute a fuel cut during deceleration of the vehicle so as to cut supply of fuel to an engine of the vehicle while the vehicle is moving; and
an engine control module configured to increase, when a vehicle speed drops below a first permitted vehicle speed during the deceleration of the vehicle, an operation rate of the compressor for a predetermined period so as to exceed the operation rate of the compressor before the vehicle speed drops below the first permitted vehicle speed, the first permitted vehicle speed being higher than a fuel cut recovery vehicle speed when an air conditioner is on, and the compressor being actuated when the vehicle speed drops below the fuel cut recovery vehicle speed and the air conditioner is on,
wherein the predetermined period is after a drop of the vehicle speed below the first permitted vehicle speed and prior to a drop of the vehicle speed below the fuel cut recovery vehicle speed, and
wherein, during the predetermined period, the compressor is actuated regardless of a signal from a thermo switch configured to communicate with the engine control module.

8. The air conditioning control method of claim 6, wherein the vehicle further comprises an engine control module in communication with the compressor; and
wherein the method further comprises:
controlling, by the engine control module, the operation rate of the compressor so as to increase the operation rate for the predetermined period; and
actuating, by the engine control module, the compressor when the vehicle speed drops below the fuel cut recovery vehicle speed and the air conditioner is on.

* * * * *